United States Patent

Matsuda et al.

(10) Patent No.: US 10,075,097 B2
(45) Date of Patent: Sep. 11, 2018

(54) POWER CONVERSION DEVICE AND AC ELECTRIC-VEHICLE DRIVE SYSTEM

(71) Applicant: Mitsubishi Electric Corporation, Tokyo (JP)

(72) Inventors: Kotaro Matsuda, Tokyo (JP); Hisanori Yamasaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 197 days.

(21) Appl. No.: 15/034,777

(22) PCT Filed: Nov. 28, 2013

(86) PCT No.: PCT/JP2013/082092
§ 371 (c)(1),
(2) Date: May 5, 2016

(87) PCT Pub. No.: WO2015/079540
PCT Pub. Date: Jun. 4, 2015

(65) Prior Publication Data
US 2017/0033711 A1   Feb. 2, 2017

(51) Int. Cl.
*H02G 3/00* (2006.01)
*H02M 7/5395* (2006.01)
(Continued)

(52) U.S. Cl.
CPC ............. *H02M 7/5395* (2013.01); *B60L 9/08* (2013.01); *B60L 9/28* (2013.01); *H02M 5/4585* (2013.01);
(Continued)

(58) Field of Classification Search
None
See application file for complete search history.

(56) References Cited

U.S. PATENT DOCUMENTS 7,733,674 B2   6/2010   Imazu et al.
2005/0285582 A1   12/2005   Azuma et al.
(Continued)

FOREIGN PATENT DOCUMENTS

JP   2000-184729 A   6/2000
JP   2006-014449 A   1/2006
(Continued)

OTHER PUBLICATIONS

International Search Report (PCT/ISA/210) dated Feb. 18, 2014, by the Japanese Patent Office as the International Searching Authority for International Application No. PCT/JP2013/082092 (three pages).
(Continued)

*Primary Examiner* — Cassandra Cox
(74) *Attorney, Agent, or Firm* — Buchanan Ingersoll & Rooney PC

(57) ABSTRACT

To generate a PWM signal, as an on/off signal of a semiconductor switch that constitutes a power conversion main circuit, by comparing a modulation wave command based on an input voltage waveform command of the power conversion main circuit with a carrier wave having changes from a lower limit to an upper limit and from the upper limit to the lower limit for an integral number of times per one cycle of an AC power supply, where the carrier wave has characteristics such that one change time from the lower limit to the upper limit and then returning to the lower limit is constant, and a time ratio between a change time from the lower limit to the upper limit and a change time from the upper limit to the lower limit changes periodically.

12 Claims, 15 Drawing Sheets

(51) Int. Cl.
*H02M 5/458* (2006.01)
*B60L 9/28* (2006.01)
*B60L 9/08* (2006.01)

(52) U.S. Cl.
CPC ....... *B60L 2200/26* (2013.01); *B60L 2210/30* (2013.01); *B60L 2220/42* (2013.01); *Y02T 10/648* (2013.01)

(56) References Cited

U.S. PATENT DOCUMENTS

| | | | |
|---|---|---|---|
| 2010/0087971 A1 | 4/2010 | Yamasaki | |
| 2014/0239870 A1* | 8/2014 | Nawa | H02M 7/53871 318/503 |
| 2015/0035284 A1* | 2/2015 | Yang | H02M 5/42 290/55 |

FOREIGN PATENT DOCUMENTS

| | | |
|---|---|---|
| JP | 2008-154444 A | 7/2008 |
| JP | 2010-004725 A | 1/2010 |
| JP | 2010-068552 A | 3/2010 |
| JP | 2010-115081 A | 5/2010 |
| JP | 4537802 B | 6/2010 |
| WO | WO 2008/107992 A1 | 9/2008 |

OTHER PUBLICATIONS

Written Opinion (PCT/ISA/237) dated Feb. 18, 2014, by the Japanese Patent Office as the International Searching Authority for International Application No. PCT/JP2013/082092 (two pages).

"PWM converter technology for railway rolling stock vehicle," Rolling stock & Technology, pp. 8 to 11 (Sep. 1999).

Notice of Rejection dated Feb. 9, 2016, in corresponding Japanese Patent Application No. 2015-550273, four pages.

* cited by examiner

| STATE OF FORMATION | | MTr1 | | MTr2 | |
|---|---|---|---|---|---|
| | | C/I1 | C/I2 | C/I3 | C/I4 |
| WHEN NORMAL | | 0 | 90 | 45 | 135 |
| ONE C/I IS OPENED | (a) | X | SPREAD-SPECTRUM PWM | 45 | 135 |
| | (b) | SPREAD-SPECTRUM PWM | X | 45 | 135 |
| | (c) | 0 | 90 | X | SPREAD-SPECTRUM PWM |
| | (d) | 0 | 90 | SPREAD-SPECTRUM PWM | X |
| TWO C/I ARE OPENED | (a) | X | X | 0 | 90 |
| | (b) | X | 0 | X | 90 |
| | (c) | X | 0 | 90 | X |
| | (d) | 0 | X | X | 90 |
| | (e) | 0 | X | 90 | X |
| | (f) | 0 | 90 | X | X |

POWER CONVERSION DEVICE AND AC ELECTRIC-VEHICLE DRIVE SYSTEM

FIELD

The present invention relates to a power conversion device including converters.

BACKGROUND

In an AC electric vehicle, regulations with respect to inductive interference in a specific frequency band are defined strictly in order to prevent an erroneous motion of a ground device, and it is desired to achieve suppression of a harmonic current highly accurately.

As suppression measures of a harmonic current in an AC electric vehicle, Non Patent Literature 1 listed below discloses a technique of reducing a harmonic current in a specific frequency band by shifting a phase of a carrier wave provided to a plurality of converters by a preset phase (hereinafter, "phase shift") to cancel the harmonic current generated by converters in the specific frequency band.

CITATION LIST

Non Patent Literature

Non Patent Literature 1: "PWM converter technology for railway rolling stock vehicle", pp. 8 to 11, Rolling stock & Technology, September 1999

SUMMARY

Technical Problem

When a power conversion device provided with a converter is mounted on an AC electric vehicle, it is general to have such a configuration that a plurality of power conversion devices are connected to a main transformer that receives AC power from an AC overhead wire.

A case where there are two main transformers, two output windings are provided in each main transfer, and one power conversion device is respectively connected to each of the two output windings is considered here. In this case, there is electromagnetic coupling interference between the two output windings of the main transformer, and a total value of the current generated by the two power conversion devices is affected by the electromagnetic coupling interference. However, conditions of the two main transformers become identical or equivalent conditions. Therefore, even if the conventional method described above is used, suppression of the harmonic current is possible under conditions where the two power conversion devices are always connected.

However, if only one power conversion device is connected to one of the two main transformers, or even if the two power conversion devices are connected thereto, if one power conversion device has a fault and stops operating, the electromagnetic conditions of the two main transformers become different from each other. Therefore, there is a problem that suppression of the harmonic current may be insufficient and cannot be achieved highly accurately only by the conventional method described above.

The present invention has been achieved in view of the above problems, and an object of the present invention is to provide a power conversion device that can achieve suppression of a harmonic current highly accurately, regardless of the connection statuses of a main transformer and the power conversion device.

Solution to Problem

In order to solve the problems and achieve the object, according to an aspect of the present invention, there is provided a power conversion device including: a power conversion main circuit for converting power supplied from an AC power supply to a direct current; and a control unit that generates and outputs a PWM signal, the PWM signal being an on/off signal of a semiconductor switch that constitutes the power conversion main circuit, wherein the control unit includes a carrier-wave generation unit that generates and outputs a carrier wave having changes from a lower limit to an upper limit and from the upper limit to the lower limit for an integral number of times per one cycle of the AC power supply, a modulation-wave command generation unit that generates and outputs a modulation wave command based on an input voltage waveform command of the power conversion main circuit, and a comparison unit that compares the carrier wave with the modulation wave command to generate the PWM signal, wherein the carrier wave has characteristics such that one change time from the lower limit to the upper limit and then returning to the lower limit is constant, and a time ratio between a change time from the lower limit to the upper limit and a change time from the upper limit to the lower limit changes periodically, and wherein the carrier-wave generation unit generates a periodical change of the time ratio for an odd number of times in one cycle of the AC power supply.

Advantageous Effects of Invention

According to the present invention, suppression of a harmonic current can be achieved highly accurately, regardless of the connection statuses of a main transformer and the power conversion device.

DESCRIPTION OF EMBODIMENTS

Embodiments of a power conversion device according to the present invention will be explained below in detail with reference to the accompanying drawings. The present invention is not limited to the embodiments.

First Embodiment

Figure 1:
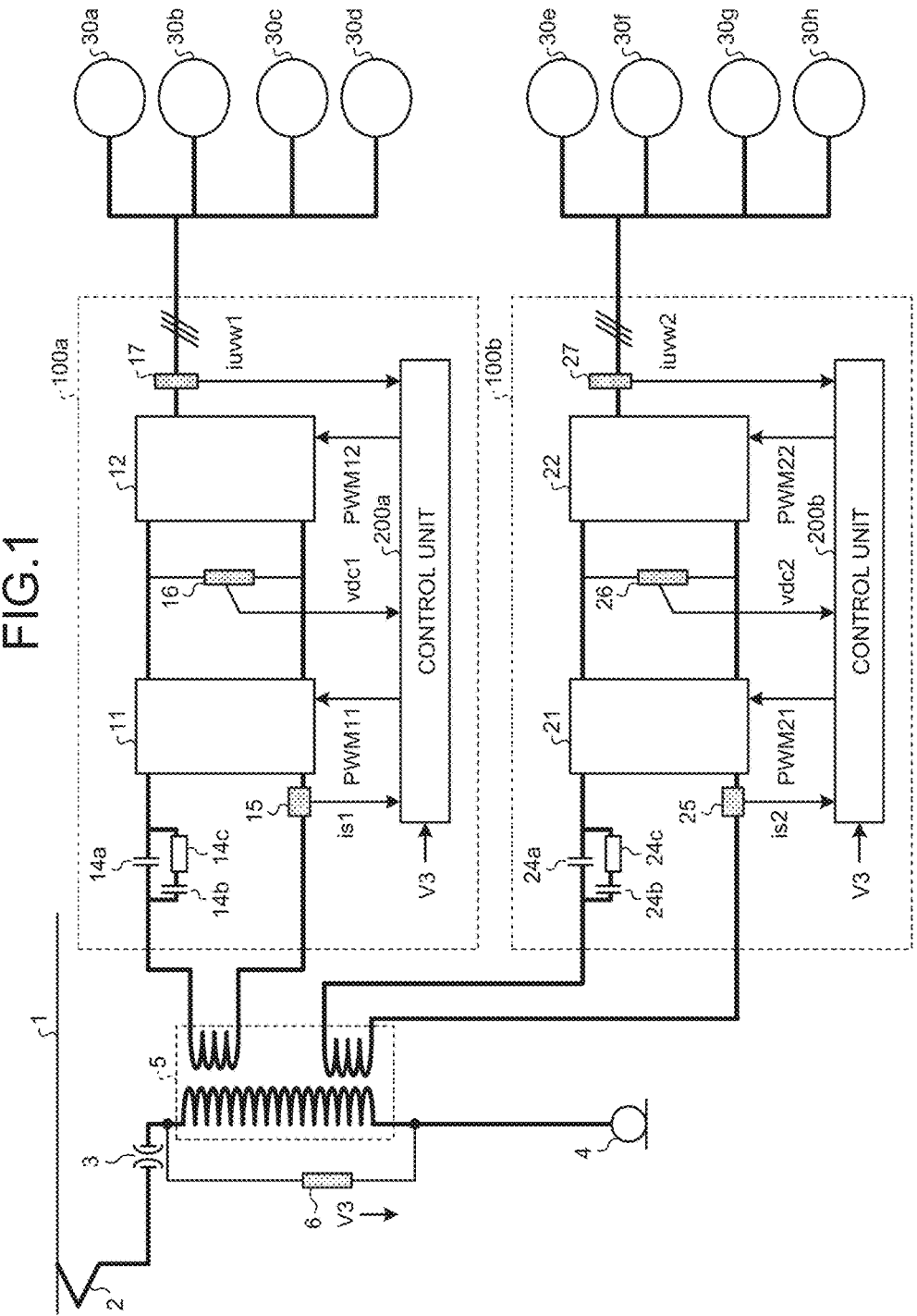
FIG. 1 is a diagram illustrating a configuration example of an AC electric-vehicle drive system including a power conversion device according to a first embodiment.

FIG. 1 is a diagram illustrating a configuration example of an AC electric-vehicle drive system including a power conversion device according to a first embodiment. In FIG. 1, the AC electric-vehicle drive system according to the first embodiment has such a configuration that AC power from an AC overhead wire 1, as an AC power supply, is received via a pantograph 2, a trolley circuit breaker 3, and a transformer 5 as a main transformer, and the received AC power is supplied (applied) to a power conversion device 100 (100a and 100b) to drive eight AC electric motors 30a to 30h. One end of the transformer 5 is connected to the trolley circuit breaker 3, and the other end thereof is connected to wheels 4. An input voltage detector 6 that detects an applied voltage across the transformer 5 is provided on a primary side of the transformer 5.

A secondary side of the transformer 5 is connected to the two power conversion devices 100a and 100b. The power conversion device 100a includes a converter 11, an inverter 12, and a control unit 200a. The power conversion device 100b includes a converter 21, an inverter 22, and a control unit 200b. An output side of the inverter 12 is connected to the AC electric motors 30a to 30d, and an output side of the inverter 22 is connected to the AC electric motors 30e to 30h.

The power conversion device 100a includes various constituent units for flexibly executing power transfer control, and specifically includes, for the power conversion device 100a, a contactor 14a as a first contactor, a contactor 14b as a second contactor, and a charging resistor 14c connected to the contactor 14b in parallel are provided on an input side of the converter 11. Further, the power conversion device 100a is configured to include an input current detector 15 that detects a current flowing in and out between the transformer 5 and the converter 11, a DC voltage detector 16 that detects a voltage of a DC unit that electrically connects between the converter 11 and the inverter 12, and an output current detector 17 that detects a current flowing in and out between the inverter 12 and the AC electric motors 30a to 30d.

The power conversion device 100b has the same configuration as described above, and contactors 24a and 24b and a charging resistor 24c connected to the contactor 24b in parallel are provided on an input side of the converter 21, for the power conversion device 100b. Further, the power conversion device 100b is configured to include an input current detector 25, a DC voltage detector 26, and an output current detector 27, for the power conversion device 100b.

An input voltage V3 detected by the input voltage detector 6, an input current is1 detected by the input current detector 15, a DC voltage vdc1 detected by the DC voltage detector 16, and an output current iuvw1 detected by the output current detector 17 are input to the control unit 200a.

The control unit 200a generates a PWM signal PWM11 for executing PWM (pulse width modulation) control of a semiconductor switch provided in the converter 11 by using a part or all of the input voltage V3, the input current is1, the DC voltage vdc1, and the output current iuvw1, and outputs the PWM signal PWM 11 to the converter 11.

The control unit 200a also generates a PWM signal PWM12 for executing PWM control of a semiconductor switch provided in the inverter 12 by using a part or all of the input voltage V3, the input current is1, the DC voltage vdc1, and the output current iuvw1, and outputs the PWM signal PWM12 to the inverter 12.

The control unit 200b has the same configuration as described above. The input voltage V3, an input current is2 detected by the input current detector 25, a DC voltage vdc2 detected by the DC voltage detector 26, and an output current iuvw2 detected by the output current detector 27 are input to the control unit 200b. The control unit 200b generates a PWM signal PWM21 for executing PWM control of a semiconductor switch provided in the converter 21 by using a part or all of the input voltage V3, the input current is2, the DC voltage vdc2, and the output current iuvw2, and outputs the PWM signal PWM21 to the converter 21. The control unit 200b also generates a PWM signal PWM22 for executing PWM control of a semiconductor switch provided in the inverter 22, and outputs the PWM signal PWM22 to the inverter 22.

Circuit configurations and operations of the inverters 12 and 22 have been known, and detailed descriptions thereof will be omitted. Circuit configurations and operations of the converters 11 and 21 are described later.

Figure 2:
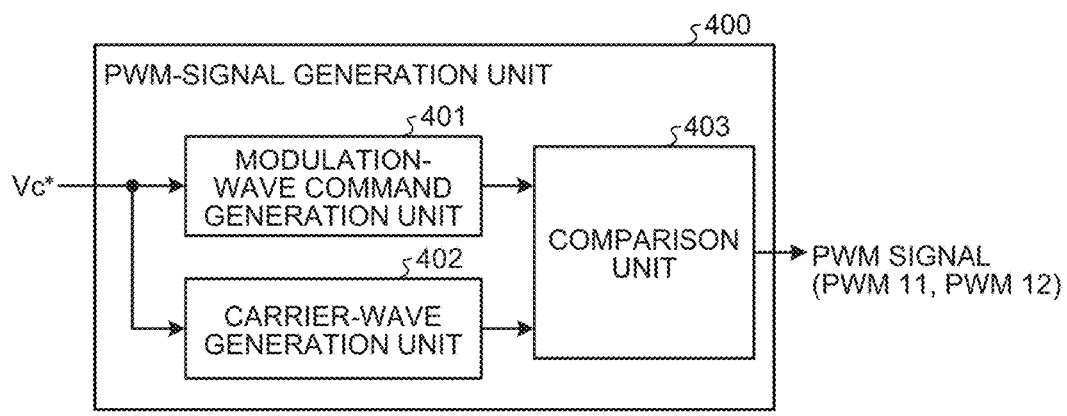
FIG. 2 is a diagram illustrating a configuration example of a PWM-signal generation unit provided in control units.

FIG. 2 is a diagram illustrating a configuration example of a PWM-signal generation unit 400 provided in each of the control units 200a and 200b. As illustrated in FIG. 2, the PWM-signal generation unit 400 is configured to include a modulation-wave command generation unit 401, a carrier-wave generation unit 402, and a comparison unit 403. An input voltage waveform command Vc* is input to the modulation-wave command generation unit 401 and the carrier-wave generation unit 402. The modulation-wave command generation unit 401 generates and outputs a modulation wave command based on the input voltage waveform command. The carrier-wave generation unit 402 generates and outputs a carrier wave having changes from a lower limit to an upper limit and from the upper limit to the lower limit for an integral number of times per one cycle of a trolley voltage. The comparison unit 403 compares the carrier wave with the modulation wave, and generates and outputs a PWM signal (corresponding to the PWM signals PWM11 and PWM12 described above) based on a comparison result. Details of the modulation wave and the carrier wave are described later.

Figure 3:
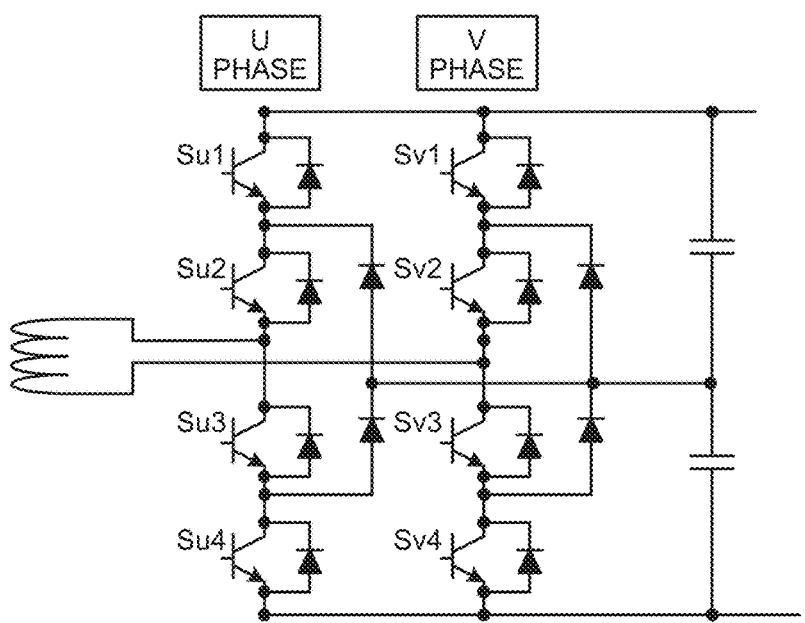
FIG. 3 is a diagram illustrating a general circuit configuration when a power converter main circuit is a single-phase three-level converter, as an example of converters.
Figure 4:
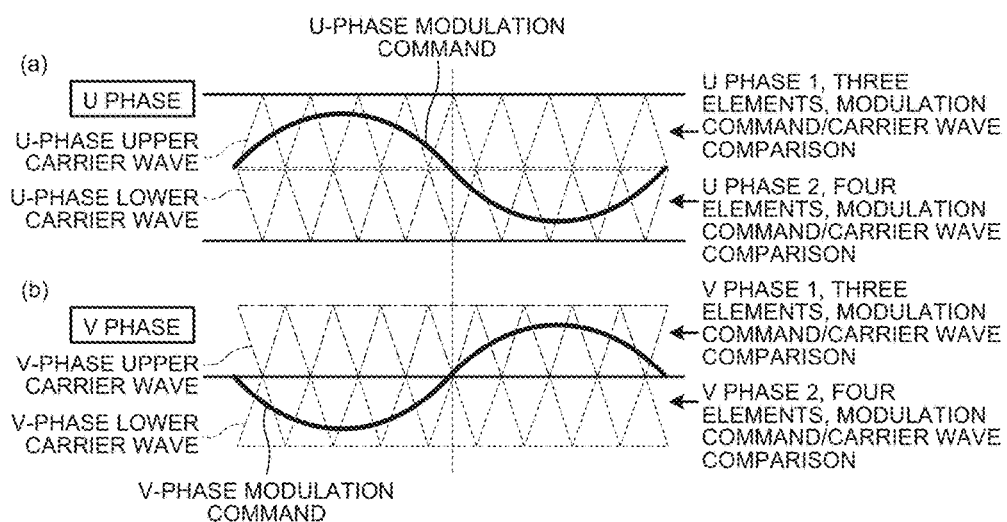
FIG. 4 is a diagram illustrating a modulation command and a carrier wave to be used for executing PWM control on the single-phase three-level converter.

Various techniques regarding the control of the converter are described next. FIG. 3 is a diagram illustrating a general circuit configuration when a power converter main circuit is a single-phase three-level converter, as an example of the converters 11 and 21. FIG. 4 is a diagram illustrating a modulation command and a carrier wave to be used for generation of the PWM signal for executing PWM control of the single-phase three-level converter illustrated in FIG. 3. A method illustrated in FIG. 4 is a conventionally existing publicly-known technique.

As shown in FIG. 3, the single-phase three-level converter is configured by serially connecting semiconductor switches Su1 to Su4 in which a transistor and a diode are connected in inverse-parallel to constitute one arm, and connecting these semiconductor switches of one arm in two parallel groups as a U-phase arm and a V-phase arm.

In (a) in FIG. 4, a carrier wave (a U-phase upper carrier wave) to be used at the time of generating the PWM signal for controlling the semiconductor switches Su1 and Su3 in the U phase in FIG. 3 (hereinafter, denoted as "U phase 1, three elements", and the same applies to other semiconductor switches) is illustrated by a broken line in an upper stage, and a carrier wave (a U-phase lower carrier wave) to be used at the time of generating the PWM signal for controlling U phase 2, four elements is illustrated by a one-dot chain line in a lower stage.

Similarly, in the upper stage of (b) in FIG. 4, a carrier wave (a V-phase upper carrier wave) to be used at the time of generating the PWM signal for controlling V phase 1, three elements in FIG. 3 is illustrated by a broken line, and a carrier wave (a V-phase lower carrier wave) to be used at the time of generating the PWM signal for controlling V phase 2, four elements is illustrated by a one-dot chain line in the lower stage.

In these drawings, the respective carrier waves are compared with the modulation command (also referred to as "voltage command") synchronized with a cycle of a trolley voltage (a power supply frequency) as illustrated by a solid line, and the PWM signal to be added to the respective semiconductor switches is generated and output based on a comparison result thereof. As described in the background art, after the carrier wave is synchronized with the trolley voltage, an amount of phase shift (hereinafter, "phase shift amount" or "phase shift width") preset for each converter is added thereto to generate the carrier wave.

Figure 5:
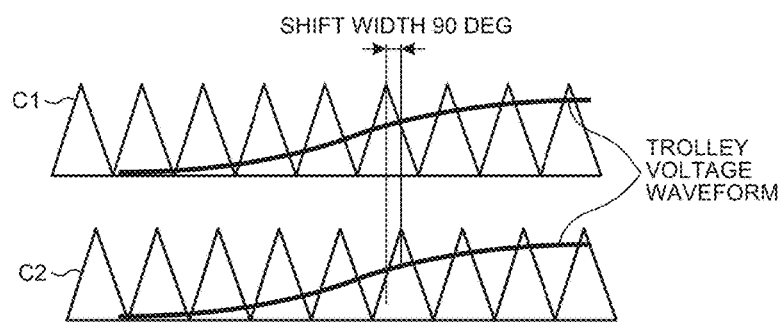
FIG. 5 is an explanatory diagram of "phase shift" with respect to a waveform of a carrier wave.

FIG. 5 is an explanatory diagram of the "phase shift" with respect to a waveform of a carrier wave. In FIG. 5, a carrier wave waveform C2 illustrated in a lower stage has a phase delay of 90 degrees with respect to a carrier wave waveform C1 illustrated in the upper stage. That is, the example in FIG. 5 is the carrier wave waveform when the phase shift width is set to 90 degrees.

Figure 6:
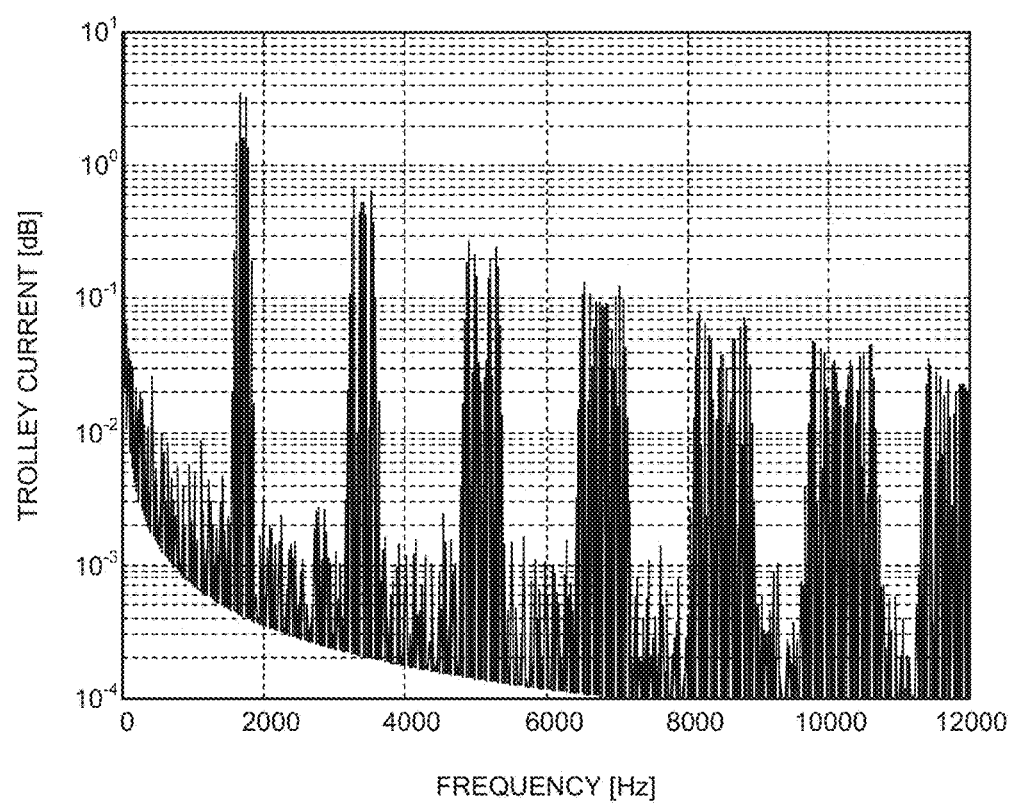
FIG. 6 is a diagram illustrating an example of frequency characteristics of a trolley current superimposed with a harmonic current by one converter.

FIG. 6 is a diagram illustrating an example of frequency characteristics of a trolley current superimposed with a harmonic current by one converter. As illustrated in FIG. 6, there is a spectrum near integral multiples of a switching frequency (a carrier wave frequency) of the converter.

Figure 7:
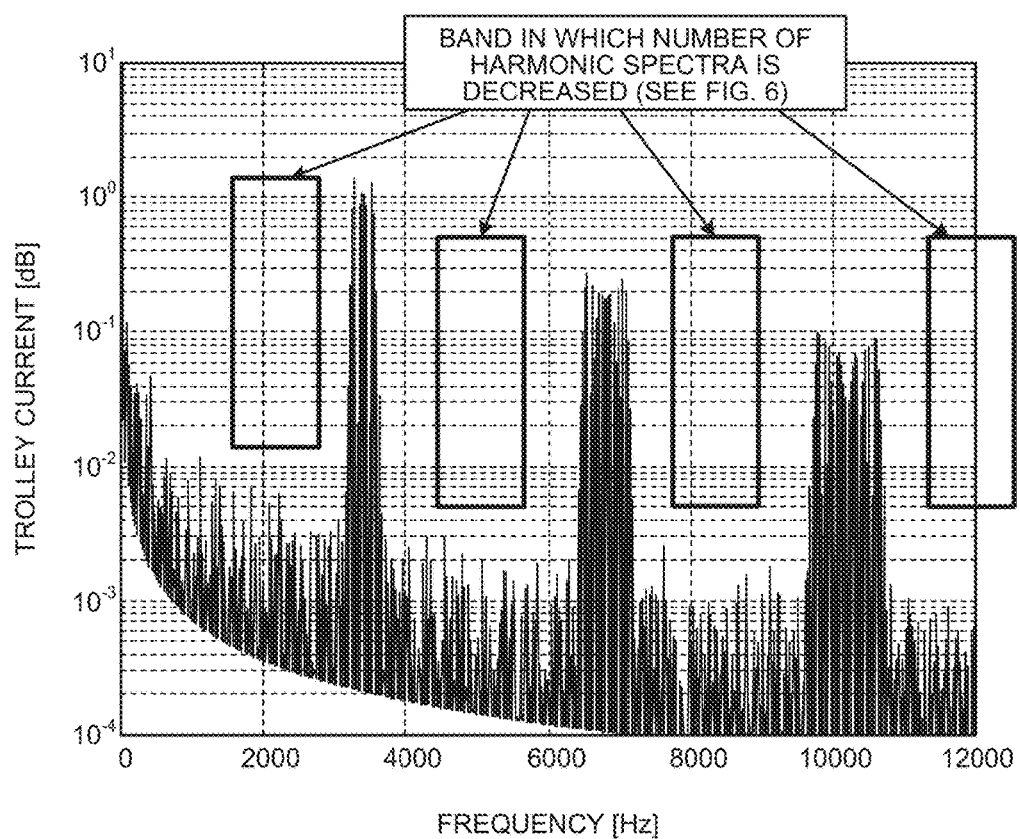
FIG. 7 is a diagram illustrating an example of the frequency characteristics of a trolley current when phase shift by 90 degrees is performed with respect to two converters.

FIG. 7 is a diagram illustrating an example of the frequency characteristics of a trolley current when phase shift by 90 degrees is performed with respect to two converters. A reduced region of the harmonic spectrum is illustrated by a square fence line. As seen from a comparison with FIG. 6, it is understood that the number of harmonic spectra can be decreased by half.

Figure 8:
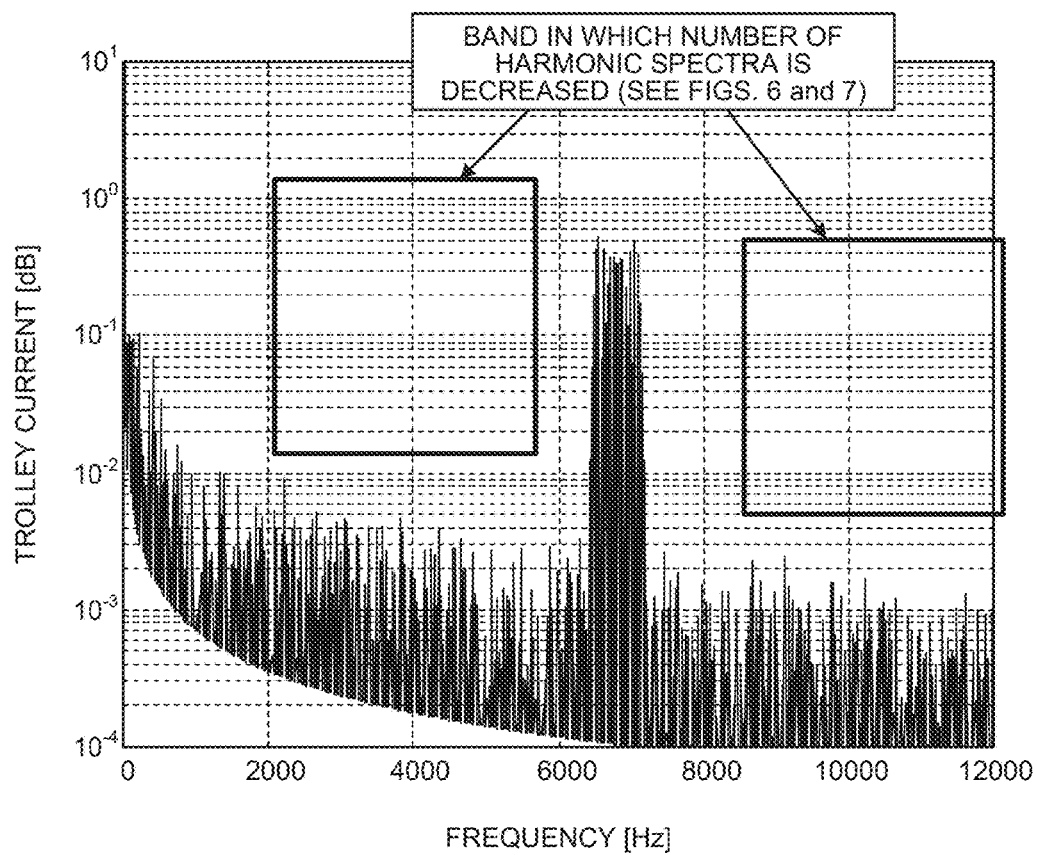
FIG. 8 is a diagram illustrating an example of the frequency characteristics of a trolley current when phase shift by 45 degrees is performed with respect to four converters.

FIG. 8 is a diagram illustrating an example of the frequency characteristics of a trolley current when phase shift by 45 degrees is performed with respect to four converters. A reduced region of the harmonic spectrum is illustrated by a square fence line as in FIG. 7. As seen from a comparison with FIG. 6 and FIG. 7, it is understood that the number of harmonic spectra can be decreased further.

Figure 9:
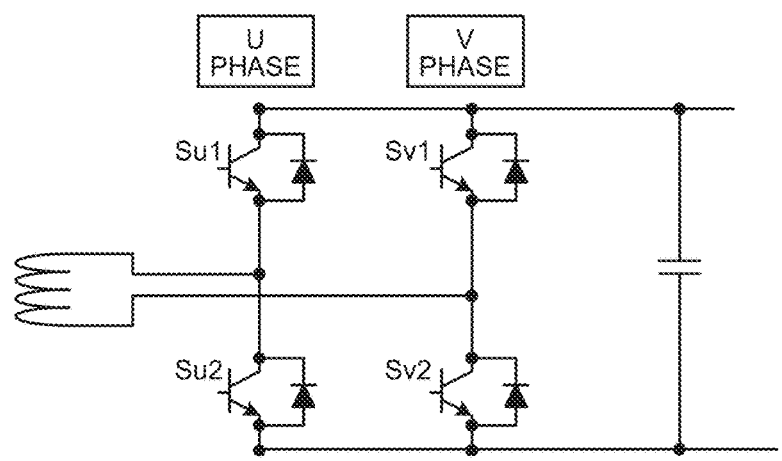
FIG. 9 is a diagram illustrating a general circuit configuration when the power converter main circuit is a single-phase two-level converter, as another example of the converters.
Figure 10:
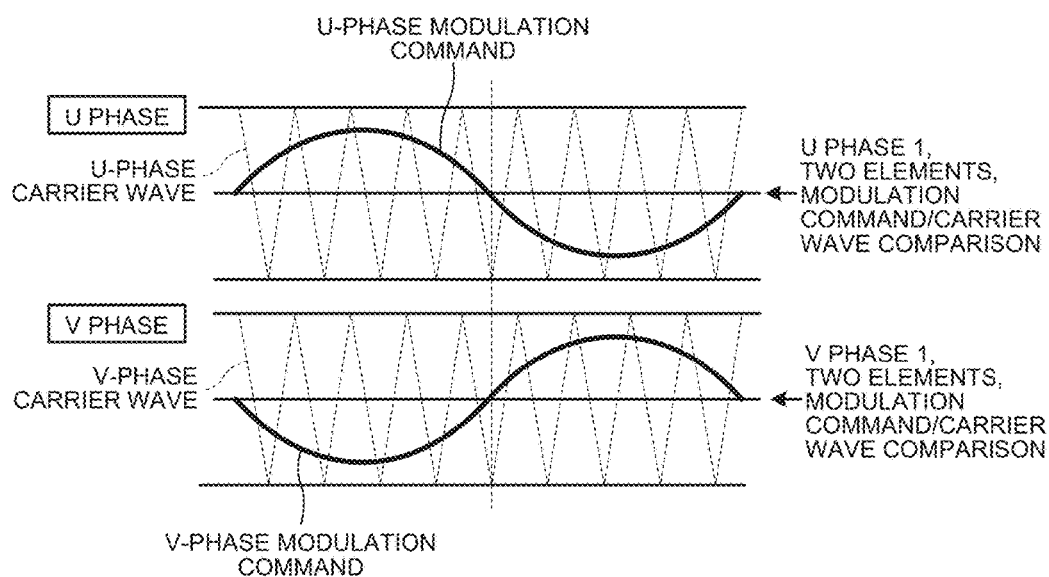
FIG. 10 is a diagram illustrating a modulation command and a carrier wave to be used for executing PWM control on the single-phase two-level converter.

FIG. 9 is a diagram illustrating a general circuit configuration when the power converter main circuit is a single-phase two-level converter, as another example of the converters 11 and 21. FIG. 10 is a diagram illustrating a modulation command and a carrier wave to be used for executing PWM control with respect to the single-phase two-level converter.

Also in the case of the single-phase two-level converter, the modulation command and the carrier wave are generated as in the single-phase three-level converter. That is, the modulation wave command with respect to two phases (a U phase and a V phase) outputs has a symmetric property with different polarities, and the carrier waves of the respective phases have a symmetric property with a same polarity, so that reduction of switching ripples superimposed on the trolley current can be achieved.

Figure 11:
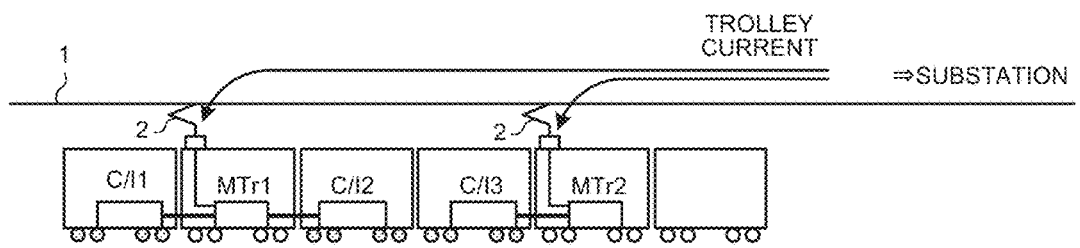
FIG. 11 is a diagram illustrating an example of a train formation suitable for describing a control method according to the first embodiment.
Figure 12:
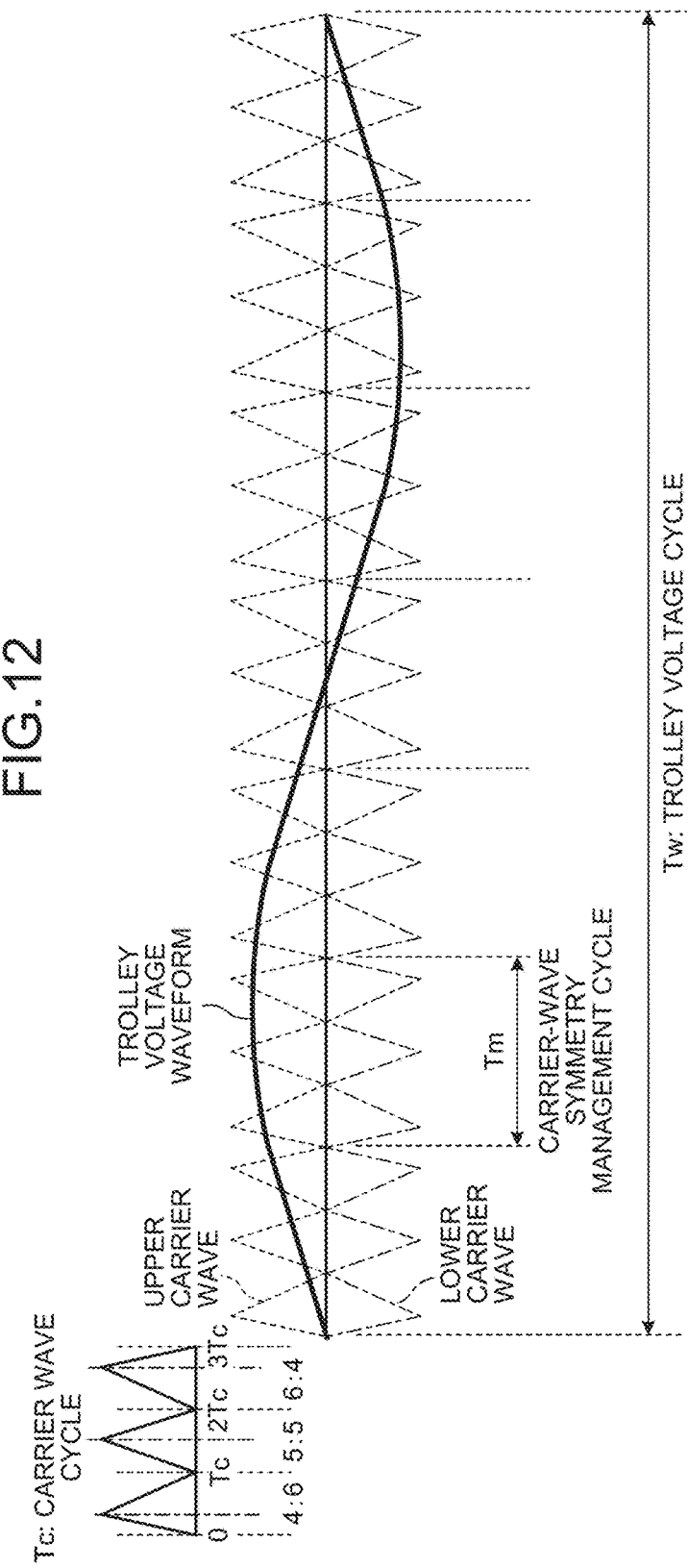
FIG. 12 is a diagram illustrating a carrier wave waveform according to the control method of the first embodiment.
Figure 13:
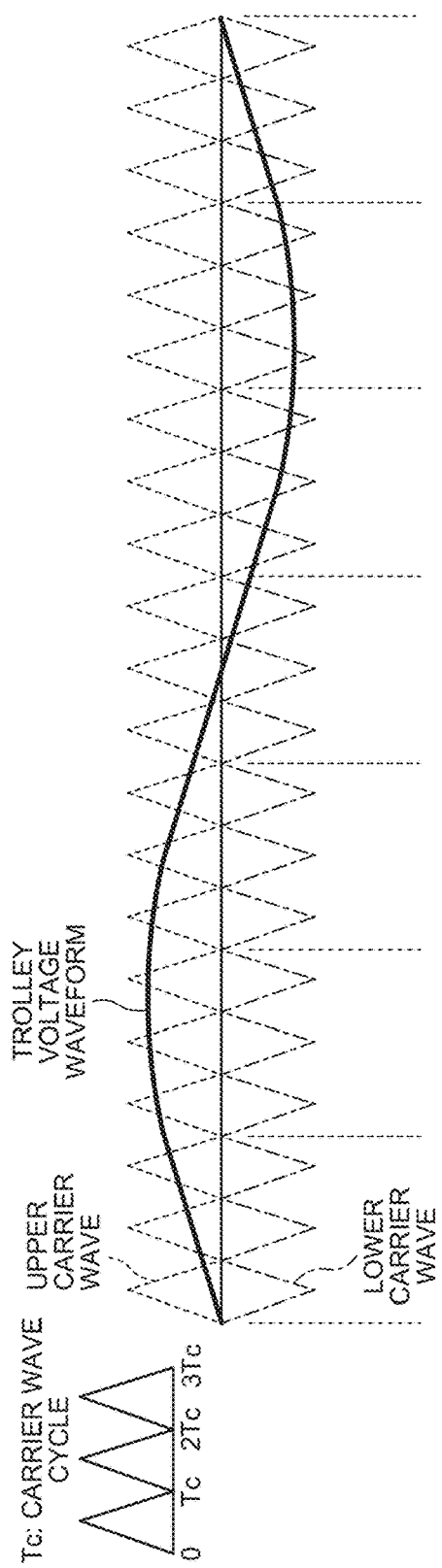
FIG. 13 is a diagram illustrating a carrier wave waveform as a comparative example to FIG. 12.

A novel control method of a converter proposed in the present application is described next with reference to FIGS. 11 to 13. FIG. 11 is a diagram illustrating an example of a train formation suitable for explaining the control method according to the first embodiment. FIG. 12 is a diagram illustrating a carrier wave waveform according to the control method of the first embodiment. FIG. 13 is a diagram illustrating a carrier wave waveform as a comparative example to FIG. 12.

In FIG. 11, notation of "C/I" denotes a converter/inverter system including a converter and an inverter as in FIG. 1, and notation of "MTr" denotes a main transformer.

In the example in FIG. 11, two output windings are provided in one MTr1, C/I1 and C/I2 are respectively connected to these two output windings, and C/I3 is connected to only one output winding in a second MTr2 (including a case where two output windings are provided, but C/I is connected to only one output winding).

In the MTr1, because there is electromagnetic coupling interference between the two output windings, it is as described above that a total value of the current generated by the C/I1 and C/I2 is affected by the electromagnetic coupling interference. On the other hand, in the MTr2, the connected C/I3 is not affected by the electromagnetic coupling interference. Accordingly, the characteristics of the harmonic currents generated by the C/I1, C/I2, and C/I3 via the respective MTr are different from each other. Therefore, even if the phase shift width illustrated in FIG. 5 is set, expecting to delete the harmonic wave between the three C/Is (for example, in each 30 degrees or each 60 degrees) with respect to the carrier waves to be added to each of the C/I1 and C/I2, cancellation of the harmonic wave may not be performed appropriately, because the characteristics of the MTr1 connected with the CM and C/I2 and the characteristics of the MTr2 connected with the C/I3 are different from each other.

If a phase difference of 90 degrees of the carrier wave is provided to the C/I1 and C/I2 in this state with respect to the carrier wave according to the conventional method, the harmonic current as illustrated in FIG. 7 is generated in a primary winding of the MTr1 and flows to an AC overhead wire. On the other hand, because the C/I3 is independently connected to the MTr2, the harmonic current as illustrated in FIG. 6 is generated via the MTr2 with respect to the carrier wave according to the conventional method, and flows to the AC overhead wire. As a result, currents illustrated in FIG. 6 and FIG. 7 are directly added, the harmonic spectrum illustrated in FIG. 6 remains in a portion surrounded by the square fence line in FIG. 7. If the harmonic regulation is applied to this portion, it is difficult to clear a regulation specification, and measures to avoid such a state need to be taken. For example, as a design capable of avoiding the inductive interference regulation, measures such as shift of generated harmonics owing to a change of the carrier wave frequency or suppression of a current value owing to enhancement of an inductance value of the MTr need to be taken for the C/Is and MTrs. However, because these measures lead to a cost increase of a cooling function, or an increase of an external shape and size due to an increase of heat generation of the semiconductor switch, these measures may not be able to be performed according to a device specification.

Therefore, according to the present embodiment, the converter is controlled by setting the carrier wave as illustrated in FIG. 12 (an upper carrier wave and a lower carrier wave). As a comparative example, a carrier wave according to the conventional method with a trolley voltage cycle Tw and a carrier wave cycle Tc being set to the same condition is illustrated in FIG. 13.

An object of setting the carrier wave as illustrated in FIG. 12 is described below.

(1) As an assumption of the control of the single-phase converter, the symmetric property of the polarity of the voltage and current needs to be maintained as much as possible to avoid bias magnetism of the transformer. Therefore, it is general to synchronize the carrier wave waveform for controlling switching of the converter with the trolley voltage cycle Tw.

(2) Because the switching frequency at the time of controlling the semiconductor element is set, taking into consideration control responsiveness of the converter and the restriction of cooling performance of a semiconductor element cooler, a set value of the carrier wave frequency may not be changed randomly.

(3) Therefore, according to the present embodiment, while the carrier wave cycle (Tc) is maintained constant, the horizontal symmetric property of a triangular waveform of the carrier wave in one cycle is changed to be asymmetric, and the horizontal symmetric property is maintained in a triangular wave group in which a plurality of triangular waveforms are assembled. In the present embodiment, a cycle of n triangular wave groups (=nTc) having the symmetric property is referred to as "carrier-wave symmetry management cycle (Tm)".

The carrier wave illustrated in FIG. 12 is described in more detail. In FIG. 12, a waveform indicated by a thick solid line is a trolley voltage waveform, a waveform indicated by a broken line is an upper carrier wave, and a waveform indicated by a one-dot chain line is a lower carrier wave. The n that decides the carrier-wave symmetry management cycle (Tm) is set to n=3, and there is a relation of Tm=3Tc. That is, as illustrated in an upper left part of FIG. 12, the same waveform is repeated in each carrier-wave symmetry management cycle Tm in which three triangular waves are gathered together. In the carrier-wave symmetry management cycle Tm, the triangular waveform has a ratio between an upward-sloping straight portion and a downward-sloping straight portion of 4:6, 5:5, and 6:4, respectively. In the following descriptions, this is denoted as (4:6), (5:5), and (6:4).

The relation between the trolley voltage cycle Tw described in (1) and the carrier-wave symmetry management cycle Tm is set to m=7 in the example of FIG. 12. That is, the carrier-wave symmetry management cycle Tm appears seven times in the trolley voltage cycle Tw (Tw=7Tm), and the number of triangular waves in the trolley voltage cycle Tw is set to 21 (Tw=7Tm=7×3Tc=21Tc).

In FIG. 12, the ratio in the carrier-wave symmetry management cycle Tm is set to (4:6), (5:5), and (6:4). However, any ratio can be used so long as the symmetric property in the carrier-wave symmetry management cycle Tm is held. For example, by reversing the relation between the first triangular wave and the third triangular wave in FIG. 12, the ratio can be set to "(6:4), (5:5), (4:6)". Further, by omitting the second triangular wave and the ratio can be set to "(4:6), (6:4)", or "(6:4), (4:6)".

Furthermore, in FIG. 12, the number of triangular waves in the trolley voltage cycle Tw is set to 21 (that is, n×m=3×7=21). These parameters n and m can take any value, so long as these are integers equal to or larger than 2. However, if it is set such that either parameter is an odd number, the value of n×m becomes an odd number by necessity. In the waveform of the PWM signal generated when the value of n×m is an odd number, both the symmetric property of 90 degrees and the symmetric property of 180 degrees are held in the trolley voltage cycle Tw, and thus the waveform is effective for reduction of the harmonic spectrum and suppression of bias magnetism of the transformer.

By using the carrier wave described above, in the output voltage waveform of the converter generated by the PWM control based on the comparison result of the carrier wave and the modulation wave, vertical symmetry (in a direction of a voltage axis) and horizontal symmetry (in a direction of a time axis) can be maintained as much as possible, while deforming a part of the switching symmetry. According to the control, distribution of the harmonic components can be dispersed by deforming a part of cyclic nature of the current ripples associated with switching, thereby enabling to suppress a peak of the harmonic spectrum appearing at integral multiples of the switching frequency, while suppressing the bias magnetism of the main transformer.

In the above descriptions, an issue is raised such that when the conventional method is used, the harmonic spectrum of C/I3 that is not cancelled remains in the portion surrounded by the square fence line in FIG. 7 in the formation illustrated in FIG. 11. In other words, it means that in the case where there is the harmonic regulation in any of the portions surrounded by the square fence line in FIG. 7, if the peak of the harmonic spectrum of the C/I3 operating independently (that is, the harmonic spectrum in FIG. 6) can be suppressed, a harmonic peak in a regulated band of the trolley current generated by the entire formation can be decreased.

Figure 14:
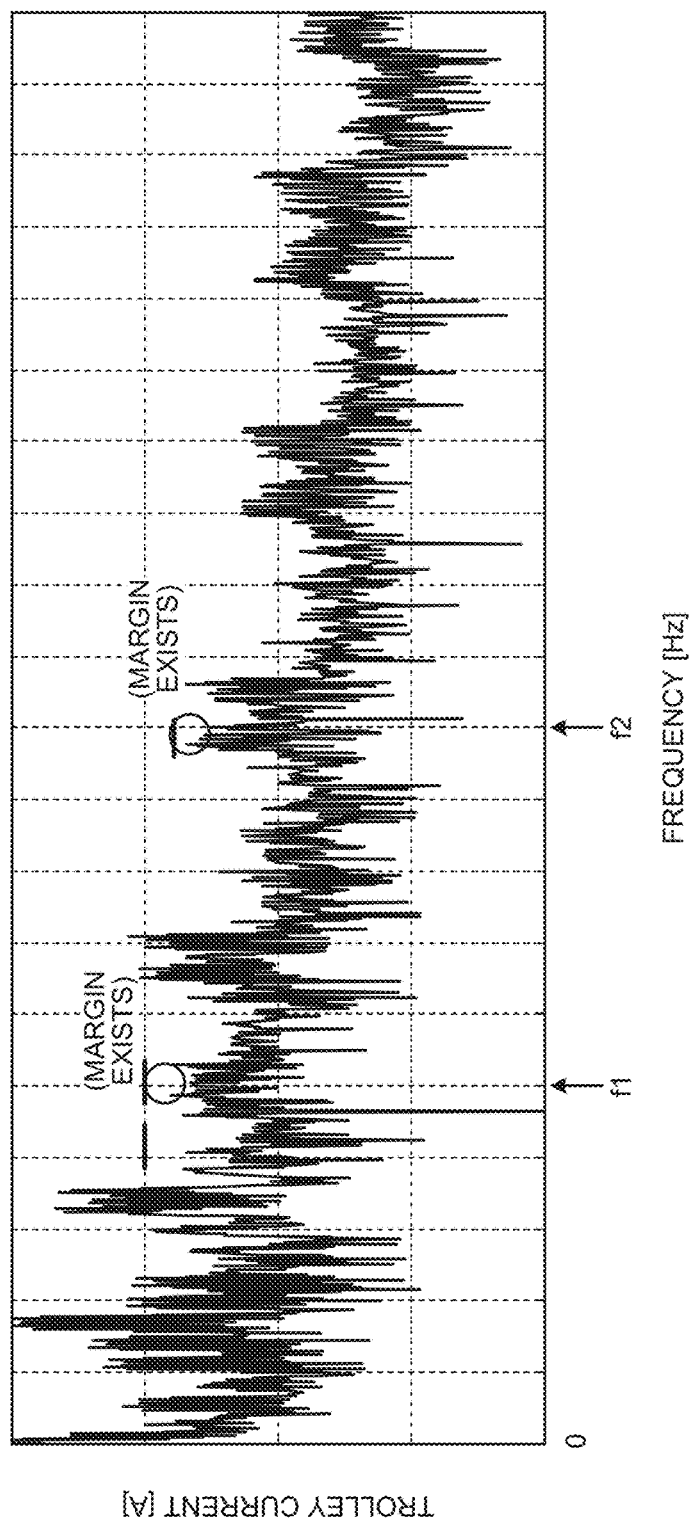
FIG. 14 is a diagram illustrating an example of frequency characteristics of a trolley current when the method according to the first embodiment is used.

Therefore, in the present embodiment, while the conventional carrier wave illustrated in FIG. 13, for example, is used with respect to the C/I1 and C/I2 connected to the MTr1, the carrier wave whose waveform changes as illustrated in FIG. 12 is applied to the C/I3 connected to the MTr2. FIG. 14 is a diagram illustrating an example of frequency characteristics of the trolley current when the present method is used. FIG. 14 illustrates frequency characteristics when the phase shift width is set to 90 degrees between the C/I1 and the C/I2, to which the conventional method is applied, while the ratio of the triangular waves in the carrier-wave symmetry management cycle Tm (=3Tc) is set to "(45:55), (50:50), (55:45)" with respect to the C/I3 to which the present method is applied, and the phase shift width is set to 45 degrees with respect to the C/I1.

In FIG. 14, for example, frequencies indicated by f1 and f2, of the frequencies at the integral multiples of the carrier wave frequency, are frequencies included in a band to which the harmonic regulation is applied. On the other hand, in the present embodiment, by changing the shape of the carrier wave of the C/I3 operating independently, a peak value of the spectrum near the integral multiples of the carrier wave frequency can be reduced, and as a result, the trolley harmonics as the entire formation can be decreased. Accordingly, as indicated by a circle in FIG. 14, a margin from a harmonic regulation value in the regulated band can be ensured.

As described above, the carrier wave waveform of the C/I3 has the cyclic nature designating the carrier-wave symmetry management cycle Tm (see FIG. 12), being integral multiples of the carrier wave cycle Tc, as a cycle. Accordingly, occurrence of polarity unbalance that induces bias magnetism of the main transformer (MTr) can be avoided. Further, because the carrier wave frequency itself does not change and is maintained constant, the control responsiveness and the heat generation characteristics of the semiconductor element can be maintained, and the power conversion function of the converter itself is not damaged.

That is, by periodically generating a waveform change of the carrier wave waveform with respect to the converter, while maintaining the carrier wave frequency at a constant level, bias magnetism of the transformer is not generated. Further, harmonic having a specific amplitude can be suppressed, while maintaining the power conversion function and the responsiveness of the converter.

When there are a plurality of converters in the formation, the number of converters and positions of the converters, to which the waveform operation described above with respect to the carrier wave is applied, need only to be selected appropriately. Accordingly, the size of a specific harmonic can be suppressed, while avoiding an interference with the harmonic suppression control by the conventional method.

Figure 15:
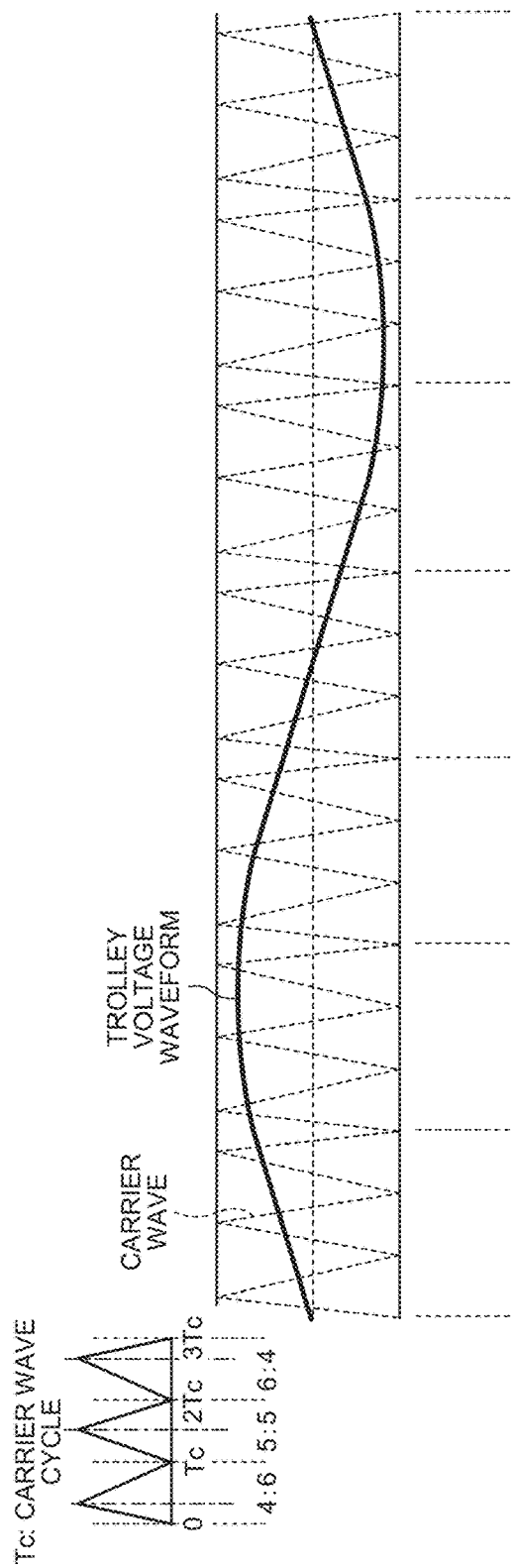
FIG. 15 is a diagram illustrating a carrier wave waveform when the control method according to the first embodiment is applied to a single-phase two-level converter.

FIG. 12 illustrates a waveform example of the carrier wave in the case where the power conversion main circuit is the single-phase three-level converter. Also in the case where the power conversion main circuit is a single-phase two-level converter, the method according to the present embodiment can be applied. FIG. 15 is a diagram illustrating a carrier wave waveform when the control method according to the first embodiment is applied to a single-phase two-level converter.

As illustrated in FIG. 15, even with respect to the single-phase two-level converter, a waveform change can be generated periodically, while maintaining the carrier wave frequency at a constant level, and effects identical to those of the single-phase three-level converter can be acquired.

As described above, according to the power conversion device of the first embodiment, the PWM signal is generated based on the comparison result between the modulation wave command based on the input voltage waveform command of the power conversion main circuit and the carrier wave brought with changes from a lower limit to an upper limit and from the upper limit to the lower limit for an integral number of times per one cycle of the AC power supply, in which one change time from the lower limit to the upper limit and then returning to the same lower limit is constant, and a time ratio between the change time from the lower limit to the upper limit and the change time from the upper limit to the lower limit changes periodically. Accordingly, suppression of the harmonic current can be achieved highly accurately, regardless of the connection status between the main transformer and the power conversion device.

Second Embodiment

According to the first embodiment, a mode in which a carrier-wave waveform operation is performed only with respect to a converter to which phase shift in a carrier wave cannot be applied has been described. However, the periodic waveform operation described above can be performed with respect to all the converters in a formation. A second embodiment is a mode in which this method is used.

Figure 16:
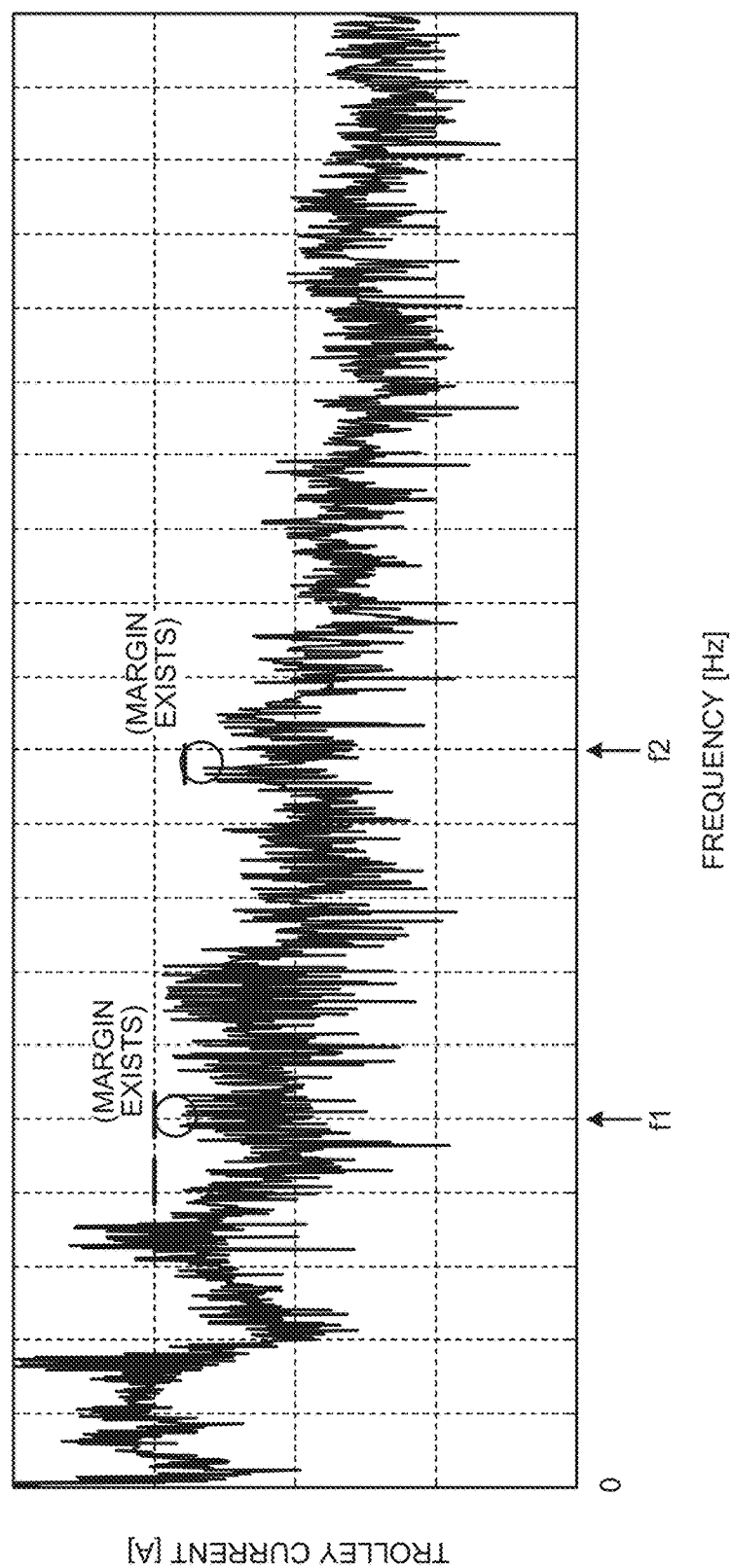
FIG. 16 is a diagram illustrating an example of frequency characteristics of a trolley current when a method according to the second embodiment is used.

FIG. 16 is a diagram illustrating an example of frequency characteristics of a trolley current when the method according to the second embodiment is used, and indicates an example in which a carrier wave, whose waveform changes as illustrated in FIG. 12, is applied with respect to the C/I1 and C/I2 connected to the MTr1 and to the C/I3 connected to the MTr2. However, specific set values are different from those in FIG. 12, and the number n of the triangular waves in the carrier-wave symmetry management cycle Tm is set to 5 (Tm=5Tc), and the ratio of the triangular waves in the carrier-wave symmetry management cycle Tm (=5Tc) is set to "(45:55), (47.5:52.5), (50:50), (52.5:47.5), (55:45)", with respect to the three converters C/I1, C/I2, and C/I3.

With reference to FIG. 16, in the band of frequencies f1 and f2 to which harmonic regulations are applied, a margin at a certain level or more can be ensured as illustrated by a circle in FIG. 16. That is, even if the method according to the second embodiment is used, in which a periodic waveform operation is performed to all the converters in the formation, the peak value of the spectrum near the integral multiples of the carrier wave frequency can be reduced, and the trolley harmonics as the entire formation can be reduced. When the method according to the second embodiment is used, the carrier wave is shared by all the converters, and thus software, a control circuit, and the like can be integrated, thereby providing a merit of reducing the management cost of products.

As FIG. 16 is compared with FIG. 14, there is a band where harmonic is reduced and on the contrary, there is a band where harmonic is slightly increased. However, it can be determined whether to adopt the method according to the first embodiment or to adopt the method according to the second embodiment, according to actual harmonic regulations.

Furthermore, if the methods according to the first and second embodiments are used simultaneously, for example, even in a relation of the number of devices in which the harmonic reduction effect cannot be expected in the phase shift in the carrier wave according to the conventional method, needless to mention, the effects described above can be acquired by the carrier-wave waveform operation according to the present application.

Third Embodiment

Figure 17:
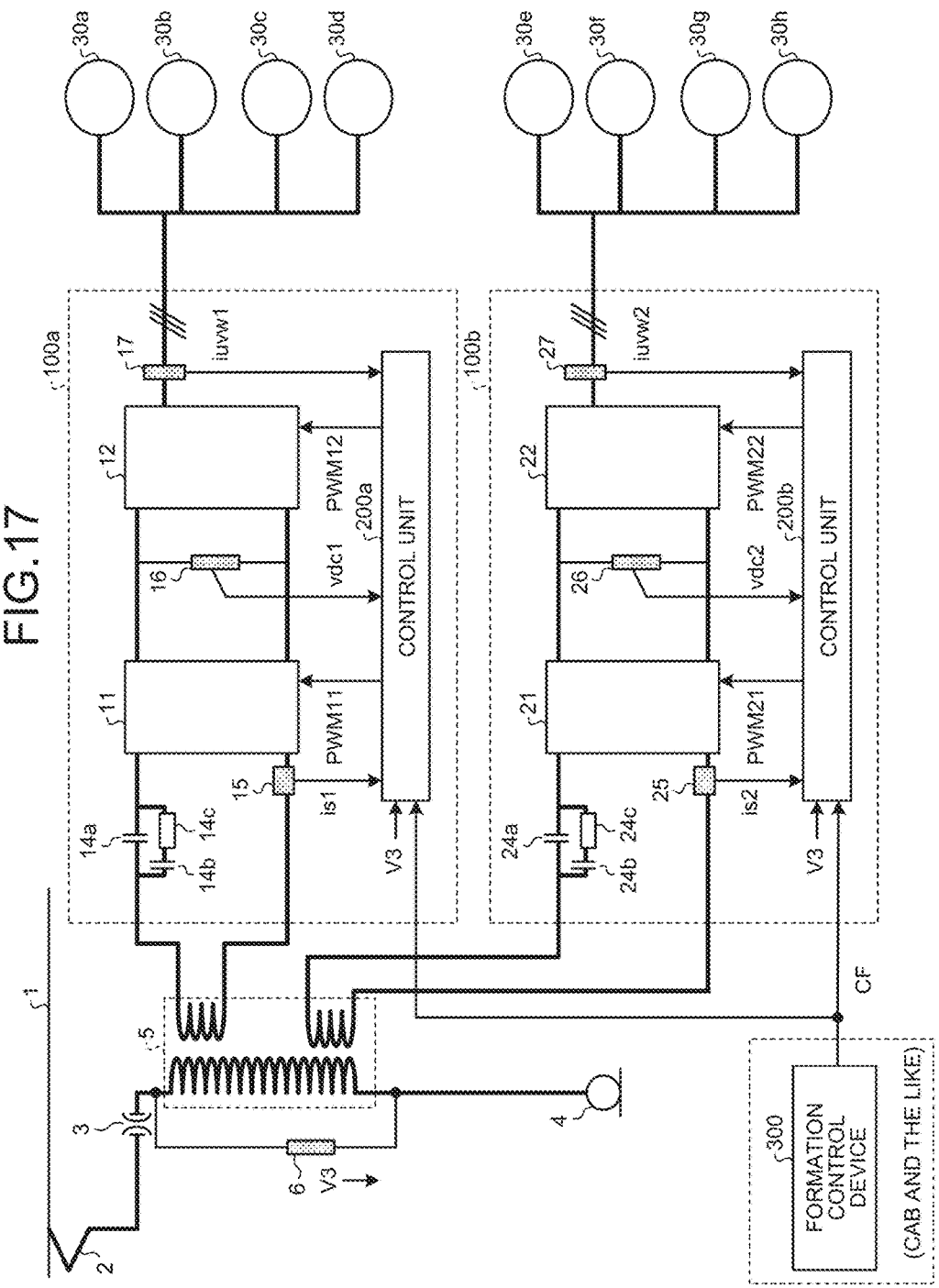
FIG. 17 is a diagram illustrating a configuration example of an AC electric vehicle drive system including a power conversion device according to a third embodiment.
Figures 18, 19:
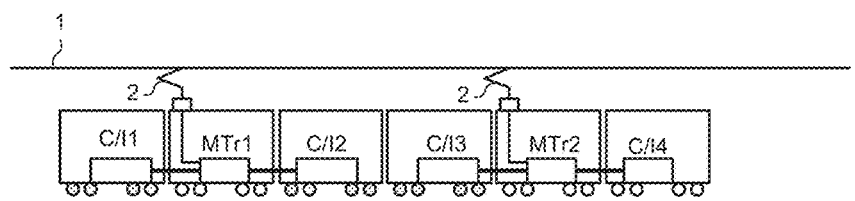
FIG. 18 is a diagram illustrating an example of a train formation suitable for explaining a control method according to the third embodiment.
FIG. 19 is a diagram illustrating a configuration example of a carrier-wave phase-shift amount setting table and a spread-spectrum carrier-wave adoption table.

FIG. 17 is a diagram illustrating a configuration example of an AC electric vehicle drive system including a power conversion device according to a third embodiment. FIG. 18 is a diagram illustrating an example of a train formation suitable for explaining a control method according to the third embodiment.

In the AC electric vehicle drive system according to the third embodiment, a formation control device 300 is added to the configuration of the AC electric vehicle drive system illustrated in FIG. 1. The formation control device 300 is provided, for example, in a cab, and a signal CF output from the formation control device 300 is input to control units 200a and 200b. Other constituent elements of the third embodiment are identical or equivalent to those illustrated in FIG. 1, these elements are denoted by like reference signs, and redundant descriptions of the configurations and operations thereof will be omitted.

Meanwhile, in an actual formation of railway vehicles, even in a state where the C/I in a part of the formation has a fault and stops operation, and is opened in terms of an electric circuit, travel needs to be continued. The faulty C/I can be detached in terms of the electric circuit, by opening both the first contactors (the contactors 14a and 24a) and the second contactors (the contactors 14b and 24b).

For example, in the formation illustrated in FIG. 18, if all the C/I1 to C/I4 are normal, harmonic reduction as illustrated in FIG. 8 can be performed by the phase shift in the carrier wave according to the conventional technique. Under this condition, it is assumed a case where the C/I1 of a certain train vehicle is opened due to a fault or the like, and the number of normal C/Is becomes three in the formation. At this time, the state is same as that of the number of devices illustrated in FIG. 11. Therefore, such an embodiment is preferable that when the C/I4 is normal, the carrier wave according to the conventional technique is used, and the phase shift in the carrier wave according to the conventional technique is applied to all the C/Is, whereas, when one C/I is opened, control to apply any of the method according to the first embodiment or the method according to the second embodiment is executed.

If the carrier wave can be switched and set according to the number of C/Is in operation in the formation, the trolley harmonic regulation can be avoided and cleared regardless of the number of converters in operation.

As illustrated in FIG. 17, in a general configuration in an actual AC electric vehicle, the respective C/Is (the power conversion devices 100a and 100b) are connected with input/output wiring for transferring the status signal CF between the formation control device 300 arranged in the cab and the C/I, and if the status signal is distributed to each C/I, each C/I can recognize the number of normal C/Is and the number of faulty and opened C/Is, a connection position, and the like in the formation.

Each C/I is provided beforehand with a table that sets a "carrier-wave phase shift amount" to be set by the own C/I according to the number of C/Is in the normally operating condition and the connection position in the formation (hereinafter, "carrier-wave phase-shift amount setting table"), and a setting table that sets which of "normal carrier wave" and "spread-spectrum carrier wave" is to be set (hereinafter, "spread-spectrum carrier-wave adoption table"). The carrier wave setting of the converter of the own C/I is updated according to a change of information of the operating condition of other C/Is distributed from the formation control device as needed to continue the control operation, thereby enabling to perform suppression of a trolley current harmonics as the formation according to the operating conditions of the C/Is in the formation.

The same function can be realized by setting the carrier-wave phase-shift amount setting table and the spread-spectrum carrier-wave adoption table described above in the formation control device 300, determining the number of normal C/Is and a connection position of a faulty C/I in the formation on the side of the formation control device 300, and transmitting the "carrier-wave phase shift amount" and "spread-spectrum carrier wave adoption" as control commands to each of the remaining normal C/Is according to the determination result.

Furthermore, if the number of C/Is is limited, each other's normal/faulty open information can be transmitted on a steady basis between all the C/Is without via the formation control device 300, to select a type of carrier wave of the own converter and the phase shift amount, while managing the state of other C/Is for each C/I.

FIG. 19 is a diagram illustrating a configuration example of a carrier-wave phase-shift amount setting table and a spread-spectrum carrier-wave adoption table. The table illustrated in FIG. 19 is based on the train formation illustrated in FIG. 18, and illustrates an example of set values regarding the "carrier-wave phase shift amount" and "spread-spectrum PWM adoption" at the time of all the devices being normal, at the time of opening one C/I, and at the time of opening two C/Is, with respect to one formation in which four C/Is are connected.

At the time of all the devices being normal, set values enabling to perform phase shift of 0 degree, 90 degrees, 45 degrees, and 135 degrees, which has been frequently performed conventionally, are written with respect to each of the C/I1 to C/I4.

On the other hand, at the time of opening one C/I (note: opened C/I is indicated by "x" mark), as illustrated in (a) to (d) in FIG. 19, set values such that spread spectrum PWM is applied to a C/I that does not have square harmonic characteristics, and spread spectrum PWM is applied to a pair of C/Is that have square harmonic characteristics are written. The meaning having such set values is as described in the first embodiment.

At the time of opening two C/Is, the state can be largely divided into two cases, that is, a case where two C/Is connected to the same MTr remain, and may have interference with the remaining normal C/Is ((a) and (f) in FIG. 19), and a case where one C/I remains in each MTr, and there is no wiring interference ((b) to (e) in FIG. 19). In these cases, because the harmonic characteristics generated by the remaining normal C/Is become square, a conventional "carrier-wave phase shift" can be performed, and the spread spectrum PWM may not be positively adopted according to the regulation band and the regulation value.

If a table describing the contents in the formation control device, setting of each C/I can be switched according to a change in the operating condition of the C/Is in the formation. Further, even if there is a change in the number of power conversion devices in operation in the formation, the type of carrier wave can be appropriately selected, thereby enabling to suppress the peak of a specific harmonic spectrum in any state.

Figure 20:
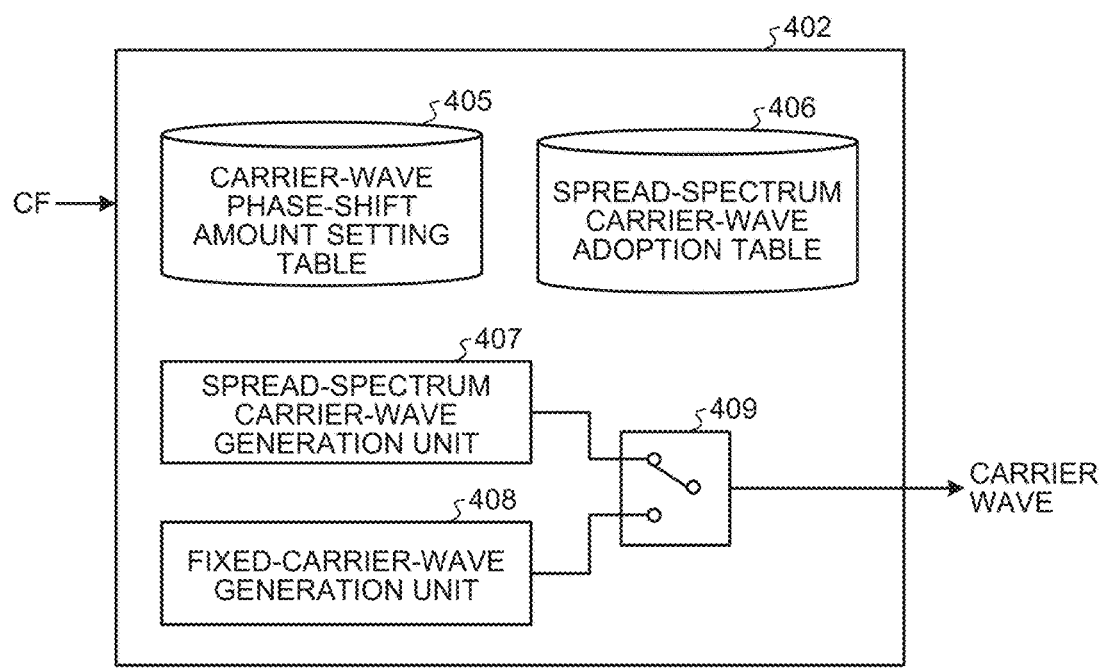
FIG. 20 is a diagram illustrating a configuration example of a carrier-wave generation unit including the carrier-wave phase-shift amount setting table and the spread-spectrum carrier-wave adoption table.

FIG. 20 is a diagram illustrating a configuration example, when the carrier-wave phase-shift amount setting table and the spread-spectrum carrier-wave adoption table are provided in the carrier-wave generation unit in each C/I. The carrier-wave generation unit 402 includes, as illustrated in FIG. 20, a carrier-wave phase-shift amount setting table 405, a spread-spectrum carrier-wave adoption table 406, a spread-spectrum carrier-wave generation unit 407, a fixed-carrier-wave generation unit 408, and an output selection unit 409.

The carrier-wave generation unit 402 is input with the signal CF output from the formation control device 300. The signal CF is a status signal obtained by monitoring the operating condition of the C/Is in the formation, but may be a control signal determined by the formation control device based on the operating condition of the C/Is in the formation. The spread-spectrum carrier-wave generation unit 407 generates a carrier wave in which the waveform of the triangular wave, the time ratio, and the like are changed according to instruction contents in the carrier-wave phase-shift amount setting table 405 and the spread-spectrum carrier-wave adoption table 406. The fixed-carrier-wave generation unit 408 generates a fixed carrier wave according to the conventional technique, in which the waveform of the triangular wave, the time ratio, and the like are not changed. The output selection unit 409 selects and outputs any of the outputs from the spread-spectrum carrier-wave generation unit 407 and the fixed-carrier-wave generation unit 408 to the comparison unit 403 (see FIG. 2).

As described above, according to the power conversion device of the third embodiment, the spread-spectrum carrier-wave generation unit that generates a carrier wave in which a time ratio between a change time from the lower limit to the upper limit and a change time from the upper limit to the lower limit changes periodically, and the fixed-carrier-wave generation unit that generates a carrier wave in which the time ratio is constant and does not change. The power conversion device selects and outputs any of outputs from the spread-spectrum carrier-wave generation unit and the fixed-carrier-wave generation unit, based on a formation operating condition monitoring signal input from the formation control device or the control signal determined and output by the formation control device based on the formation operating condition. Accordingly, even if the number of operating power conversion devices in the formation changes, the type of carrier wave can be appropriately selected, and in any state, the peak of the specific harmonic spectrum can be suppressed.

According to the first to third embodiments described above, a case where there are two main transformers MTr with two windings in a formation has been described. However, it is needless to mention that the present invention can be also applied to a case where the number of main transformers in a formation is three, or a case of a multi-winding transformer in which the number of windings of a main transformer is three or more.

The configuration described in the above embodiment is only an example of the configurations of the present invention. The configuration can be combined with other publicly-known techniques, and it is needless to mention that the present invention can be configured while modifying it without departing from the scope of the invention, such as omitting a part of the configuration.

Furthermore, in the embodiments described above, while a power conversion device assumed to be applied to an AC electric vehicle has been described as the contents of the present invention, the application field thereof is not limited thereto, and it is needless to mention that the present invention can be also applied to various industrial fields where power conversion devices that convert AC power to DC power are provided and used in plural.

INDUSTRIAL APPLICABILITY

As described above, the present invention is useful as a power conversion device that can achieve suppression of a harmonic current highly accurately, regardless of the connection statuses of a main transformer and the power conversion device.

REFERENCE SIGNS LIST

1 AC overhead wire, 2 pantograph, 3 trolley circuit breaker, 4 wheel, 5 transformer, 6 input voltage detector, 8 rail, 11, 21 converter, 12, 22 inverter, 14a, 24a contactor, 14b, 24b contactor, 14c, 24c charging resistor, 15, 25 input current detector, 16, 26 DC voltage detector, 17, 27 output current detector, 30a to 30h AC electric motor, 100 (100a, 100b) power conversion device, 200a, 200b control unit, 300 formation control device, 400 PWM-signal generation unit, 401 modulation-wave command generation unit, 402 carrier-wave generation unit, 403 comparison unit, 405 carrier-wave phase-shift amount setting table, 406 spread-spectrum carrier-wave adoption table, 407 spread-spectrum carrier-wave generation unit, 408 fixed-carrier-wave generation unit, 409 output selection unit.

The invention claimed is:

1. A power conversion device comprising:
a power conversion main circuit for converting power supplied from an AC power supply to a direct current; and
a control unit that generates and outputs a PWM signal, the PWM signal being an on/off signal of a semiconductor switch that constitutes the power conversion main circuit, wherein
the control unit includes
a carrier-wave generation unit that generates and outputs a carrier wave having changes from a lower limit to an upper limit and from the upper limit to the lower limit for an integral number of times per one cycle of the AC power supply,
a modulation-wave command generation unit that generates and outputs a modulation wave command based on an input voltage waveform command of the power conversion main circuit, and
a comparison unit that compares the carrier wave with the modulation wave command to generate the PWM signal, wherein
the carrier wave has characteristics such that one change time from the lower limit to the upper limit and then returning to the lower limit is constant, and a time ratio between a change time from the lower limit to the upper limit and a change time from the upper limit to the lower limit changes periodically, and wherein
the carrier-wave generation unit generates a periodical change of the time ratio for an odd number of times in one cycle of the AC power supply.

2. A power conversion device comprising:
a power conversion main circuit for converting power supplied from an AC power supply to a direct current; and
a control unit that generates and outputs a PWM signal, the PWM signal being an on/off signal of a semiconductor switch that constitutes the power conversion main circuit, wherein
the control unit includes
a carrier-wave generation unit that generates and outputs a carrier wave having changes from a lower limit to an upper limit and from the upper limit to the lower limit for an integral number of times per one cycle of the AC power supply,
a modulation-wave command generation unit that generates and outputs a modulation wave command based on an input voltage waveform command of the power conversion main circuit, and a comparison unit that compares the carrier wave with the modulation wave command to generate the PWM signal, wherein the carrier wave has characteristics such that one change time from the lower limit to the upper limit and then returning to the lower limit is constant, and a time ratio between a change time from the lower limit to the upper limit and a change time from the upper limit to the lower limit changes periodically, and wherein the carrier-wave generation unit generates a carrier wave in which a change from the lower limit to the upper limit and a change from the upper limit to the lower limit occur for an odd number of times per one cycle of the AC power supply.

3. The power conversion device according to claim 1, wherein the carrier-wave generation unit generates a carrier wave in which a waveform thereof becomes symmetrical before and after in a time axis direction, in one cycle of a periodical change of the time ratio.

4. The power conversion device according to claim 1, wherein the carrier-wave generation unit includes a spread-spectrum carrier-wave generation unit that generates a carrier wave in which the time ratio changes periodically, and a fixed-carrier-wave generation unit that generates a carrier wave in which the time ratio is constant and does not change, and wherein the carrier-wave generation unit selects any of outputs from the spread-spectrum carrier-wave generation unit and the fixed-carrier-wave generation unit, based on a signal obtained by monitoring a formation operating condition of the power conversion device input from a formation control device provided outside of the control unit or a control signal determined by the formation control device based on the formation operating condition of the power conversion device, and then outputs a selected output to the comparison unit.

5. The power conversion device according to claim 4, wherein when number of power conversion devices connected to each of the main transformers to be operated is different, only the power conversion device connected to any one of the main transformers selects, as a carrier wave, an output of the spread-spectrum carrier-wave generation unit, and the remaining power conversion device selects an output of the fixed-carrier-wave generation unit as a carrier wave.

6. The power conversion device according to claim 2, wherein the carrier-wave generation unit generates a carrier wave in which a waveform thereof becomes symmetrical before and after in a time axis direction, in one cycle of a periodical change of the time ratio.

7. The power conversion device according to claim 2, wherein the carrier-wave generation unit includes a spread-spectrum carrier-wave generation unit that generates a carrier wave in which the time ratio changes periodically, and a fixed-carrier-wave generation unit that generates a carrier wave in which the time ratio is constant and does not change, and wherein the carrier-wave generation unit selects any of outputs from the spread-spectrum carrier-wave generation unit and the fixed-carrier-wave generation unit, based on a signal obtained by monitoring a formation operating condition of the power conversion device input from a formation control device provided outside of the control unit or a control signal determined by the formation control device based on the formation operating condition of the power conversion device, and then outputs a selected output to the comparison unit.

8. The power conversion device according to claim 7, wherein when number of power conversion devices connected to each of the main transformers to be operated is different, only the power conversion device connected to any one of the main transformers selects, as a carrier wave, an output of the spread-spectrum carrier-wave generation unit, and the remaining power conversion device selects an output of the fixed-carrier-wave generation unit as a carrier wave.

9. An AC electric-vehicle drive system including a plurality of main transformers that output AC power from an AC overhead wire as an AC power supply to a plurality of output windings, the system comprising:

a power conversion main circuit for converting power supplied from an AC power supply to a direct current; and a control unit that generates and outputs a PWM signal, which is an on/off signal of a semiconductor switch that constitutes the power conversion main circuit, wherein the control unit includes a carrier-wave generation unit that generates and outputs a carrier wave having changes from a lower limit to an upper limit and from the upper limit to the lower limit for an integral number of times per one cycle of the AC power supply, a modulation-wave command generation unit that generates and outputs a modulation wave command based on an input voltage waveform command of the power conversion main circuit, and a comparison unit that compares the carrier wave with the modulation wave command to generate the PWM signal, and wherein in a power conversion device that is at least connected to a main transformer, the carrier wave has characteristics such that one change time from the lower limit to the upper limit and then returning to the lower limit is constant, and a time ratio between a change time from the lower limit to the upper limit and a change time from the upper limit to the lower limit changes periodically.

10. The AC electric-vehicle drive system according to claim 9, wherein the carrier-wave generation unit generates a carrier wave in which a waveform thereof becomes symmetrical before and after in a time axis direction, in one cycle of a periodical change of the time ratio.

11. The AC electric-vehicle drive system according to claim 9, wherein the carrier-wave generation unit includes a spread-spectrum carrier-wave generation unit that generates a carrier wave in which the time ratio changes periodically, and a fixed-carrier-wave generation unit that generates a carrier wave in which the time ratio is constant and does not change, and wherein the carrier-wave generation unit selects any of outputs from the spread-spectrum carrier-wave generation unit and the fixed-carrier-wave generation unit, based on a signal obtained by monitoring a formation operating condition of the power conversion device input from a formation control device provided outside of the control unit or a control signal determined by the formation control device based on the formation operating condition of the power conversion device, and then outputs a selected output to the comparison unit.

12. The AC electric-vehicle drive system according to claim 11, wherein when number of power conversion devices connected to each of the main transformers to be operated is different, only the power conversion device connected to any one of the main transformers selects, as a carrier wave, an output of the spread-spectrum carrier-wave generation unit, and the remaining power conversion device selects an output of the fixed-carrier-wave generation unit as a carrier wave.

* * * * *